Patented Feb. 17, 1948

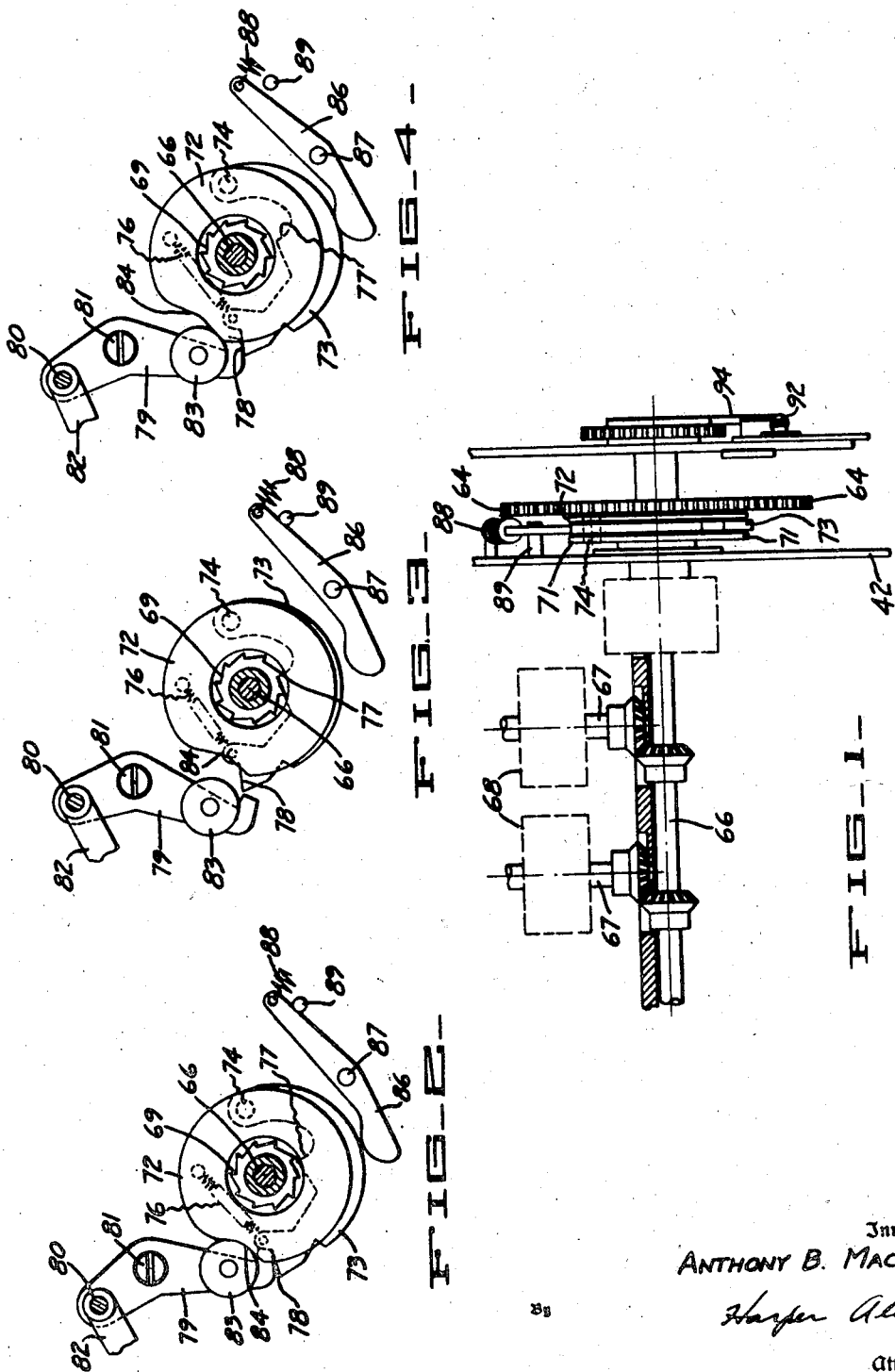

2,436,112

UNITED STATES PATENT OFFICE 2,436,112

LATCH OPERATED POSITIVE CLUTCH MECHANISM

Anthony B. Machado, Oakland, Calif., assignor to Friden Calculating Machine Co., Inc., a corporation of California Application September 7, 1942, Serial No. 457,537

5 Claims. (Cl. 192—28)

This invention relates to latch operated, positive clutch mechanisms, and more particularly to clutch mechanisms which are operable cyclically. Mechanisms embodying the invention are especially adapted for use in the cyclic driving of calculating machines.

An object of the invention is to provide improved full cycle positioning means for mechanism of the character referred to.

Another object of the invention is to provide full cycle positioning means which operates and becomes effective for centralizing the mechanism only after a driving cycle has been completed.

Other objects and advantages of the invention will be apparent from the following description of a preferred embodiment thereof as illustrated in the accompanying drawings, in which:

Figure 1 is a fragmentary plan view of the cyclic drive mechanism and a part of the actuating means.

Figure 2 is a side elevational view of the cyclic clutch with its associated stopping and centralizing means with the parts in full cycle position.

Figure 3 is a view similar to Figure 2, showing the parts just after engagement of the clutch for performance of a calculation.

Figure 4 is a view similar to Figures 2 and 3, but illustrating the position of the parts as the actuating mechanism is being stopped at the end of a machine operation.

The machine includes a transverse drive shaft 66 (Fig. 1) which is connected by beveled gearing to parallel shafts 67 having actuating means 68 thereon. Shaft 66 is cyclically operated and is adapted to be connected to a motor (not shown) by means of a pawl and ratchet clutch, the ratchet 69 (Fig. 2) of which is the driving element and connected to the motor. Ratchet 69 is disposed inside the driven portion of the clutch including disc 71 (Figures 1 and 2) secured on shaft 66 and a ring 72 secured in spaced relation from the disc 71. To establish a driving relation between the ratchet 69 and the driven assembly including disc 71 and ring 72 a clutch pawl or dog 73 is pivoted at 74 on the driven member of the clutch and has spring 76 attached to its other end to urge it toward the ratchet 69 so that its tooth 77 will engage with the teeth of the ratchet. At its free end the dog 73 is provided with a shoulder 78 for engagement by the nose of a clutch control lever 79 pivoted at 81 and having a link 82 connected thereto at 80. Link 82 forms part of a suitable linkage by means of which the clutch control lever 79 may be operated. Lever 79 is spring-urged to the position shown in Figures 2 and 4.

Depression of any operating key serves to rock clutch control lever 79 clockwise from the position shown in Figure 2 to its position as shown in Figure 3 to start operation of the machine by releasing dog 73. When clutch dog 73 is released, it moves under the urgency of spring 76 to engage its tooth 77 with one of the teeth of ratchet 69.

During rotation of the clutch the control lever 79 is maintained rocked to its clutch engaging position for substantially a full cycle (irrespective of release of the lever 79) by the engagement of roller 83 with the periphery of ring 72. In the full cycle position of the parts, roller 83 seats in depression 84 in the ring 72 which is of sufficient extent to allow clutch control lever 79 to rock inwardly as the clutch driven ring 72 approaches full cycle position so that the nose of clutch control lever 79 can engage end surface 78 of the clutch dog 73, to cause radial outward movement of the clutch dog as shown in Figure 4, when the clutch is to be disengaged to stop the operation of the machine at the end of a cycle of operation.

It will be noted that when the clutch control lever 79 is swung into the path of the shoulder 78 of the dog 73 as shown in Figure 4, for example, the dog is free to rock about its pivot 74 against the tension of spring 76 so that the dog moves radially outward with respect to the clutch. This radial movement is utilized to control its stopping and centralizing in full cycle position.

Associated with the clutch control lever 79 in the stopping and centralizing of the actuating means in full cycle position is a lever 86 (Fig. 2) pivoted at 87 and urged against the stop 89 by a strong spring 88. The lever 86 is located in opposed relation to the clutch control lever 79 with respect to the parts of the clutch and particularly the clutch dog 73 which in the full cycle position shown in Figure 2, slightly clears the rounded end of lever 86 adjacent thereto. As seen in Figure 3 where the clutch is engaged and the dog 73 is in its furthest radially inward position, the nose of lever 86 is entirely out of the path of dog 73 so that as long as the parts are rotating the lever 86 will not be engaged by the dog 73.

When the clutch control lever 79 is allowed to rock under the urgency of its spring and under control of ring 72 to the position shown in Figure 4 to cause disengagement of the clutch, the nose of the lever moves into the path of the end face 78 of the clutch dog 73 so that the dog 73 is rocked radially outwardly to disengage tooth 77 from ratchet 69. The clutch overdrives beyond full-cycle position under the momentum of the parts and as the dog 73 moves radially outwardly beyond its normal outward position shown in Figure 2 it engages the lever 86 which provides a resilient abutment or stop therefor. Thus the clutch control lever 79 and the lever 86 together serve to stop the driven parts of the clutch adjacent full cycle position. The strength of the spring 88 is preferably such that in the stopping operation the lever 86 will be rocked slightly about its pivot and off of its stop pin 89, When the driven parts of the clutch are fully stopped in their clockwise direction of rotation, the lever 88 becomes effective under the influence of its spring 88 to cause a slight counterclockwise rotation of the clutch driven parts and aid the roller 83 in centralizing such parts as shown in Figure 4.

I claim:

1. A clutch including a driving part and a driven part, said driven part including an element movable radially inwardly and outwardly to establish or break the drive, and means for stopping and centralizing the driven part of the clutch in the full cycle position thereof including a member movable into the path of said element to cause radially outward movement thereof and yieldable means engageable by said element upon said outward movement thereof to aid said member in stopping and centralizing said driven part of said clutch.

2. A clutch including a driving part and a driven part, said driven part including an element movable radially inwardly and outwardly to establish or break the drive, and means for stopping and centralizing the driven part of the clutch in the full cycle position thereof including a member movable into the path of said element to cause radially outward movement thereof and yieldable means engageable by said element upon said outward movement thereof, said last-named yieldable means yieldably urging said driven clutch part to its full-cycle position during the stopping operation.

3. The combination with a clutch having a rotary driving element and a driven element, a member carried by said driven element for controlling the driving connection between said elements, said member being movable toward the axis of rotation of said driving element to make the driving connection and being movable away from the axis to break the connection, means for disengaging said clutch and for bringing the driven element thereof to rest in a single full-cycle position, comprising a stop to engage said member and cause it to move away from the axis of rotation, and resilient means to engage said member upon overrunning of said driven element beyond full-cycle position for urging said driven element toward full-cycle position.

4. The combination with a pawl-and-ratchet clutch including a driving ratchet and a driven element equipped with a pawl engageable with said ratchet, of means for arresting said driven element in a single full-cycle position comprising stopping means to engage the pawl to disengage it from the ratchet, and a yieldable member adapted to be engaged by the pawl after it has been engaged by said stopping means for urging the driven element of the clutch toward full-cycle position.

5. The combination with a pawl-and-ratchet clutch including a driving ratchet, a driven element, and a pawl pivoted on the driven element and being engageable with said ratchet, of means for arresting said driven element in a single full-cycle position, comprising a stop movable to engage a shoulder on said pawl upon arrival of the driven element in full-cycle position, a spring-pressed member, said member being arranged with respect to said clutch so that upon overrunning of said drive element beyond full-cycle position after said stop has engaged said shoulder on said pawl a portion of said pawl intermediate the pivot thereof and said shoulder engages said spring-pressed member, whereby said spring-pressed member acting through said pawl urges said driven element to full-cycle position.

ANTHONY B. MACHADO.

REFERENCES CITED

The following references are of record in the file of this patent:

UNITED STATES PATENTS

| Number | Name | Date |
|---|---|---|
| 1,730,014 | Reece | Oct. 1, 1929 |
| 1,972,978 | Carroll et al. | Sept. 11, 1934 |
| 2,010,642 | Pierce | Aug. 6, 1935 |
| 2,294,112 | Friden | Aug. 25, 1942 |
| 2,313,817 | Friden | Mar. 16, 1943 |